UNITED STATES PATENT OFFICE.

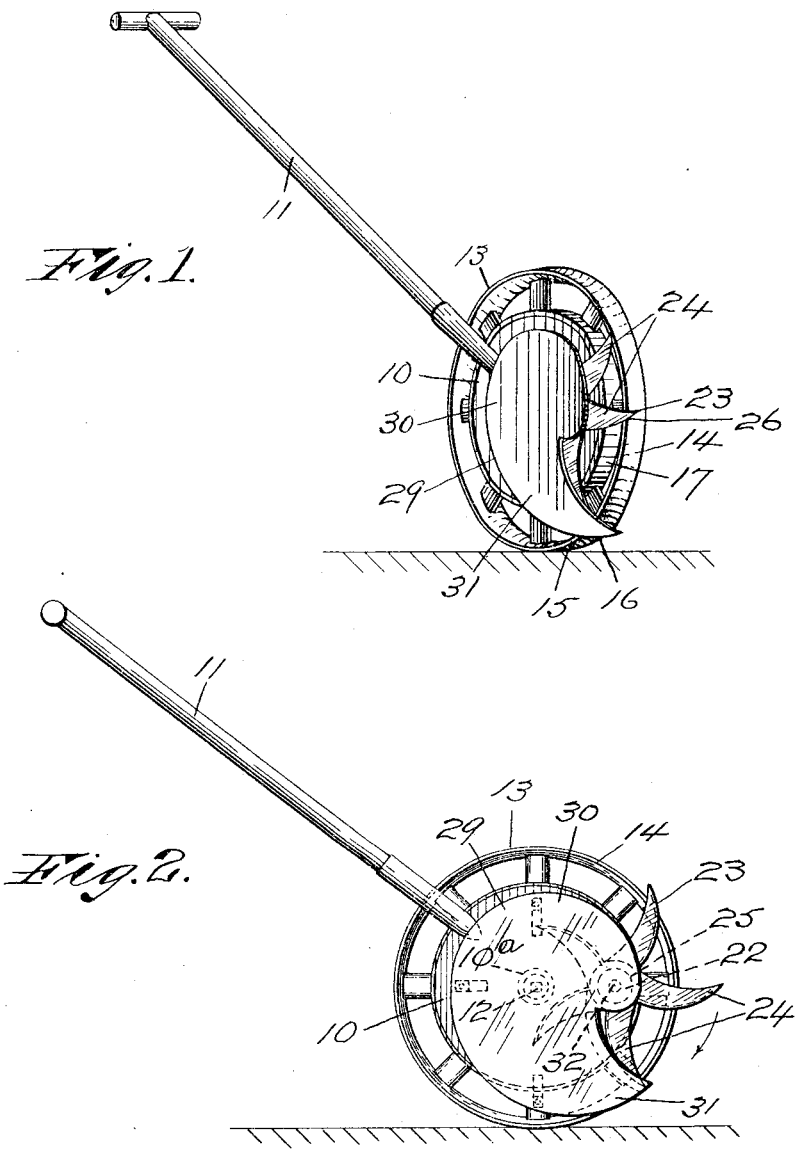

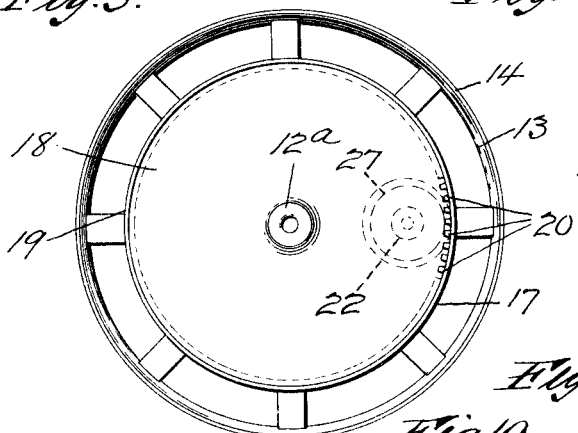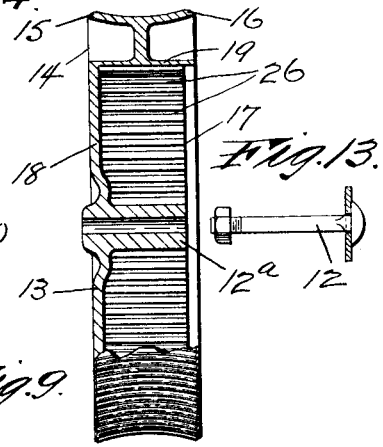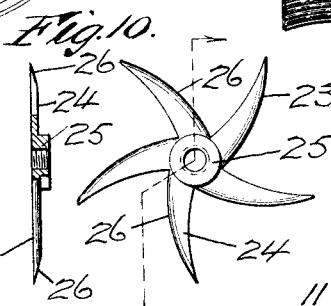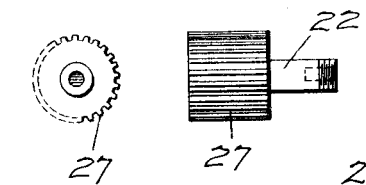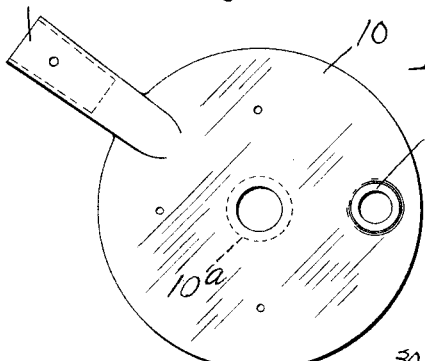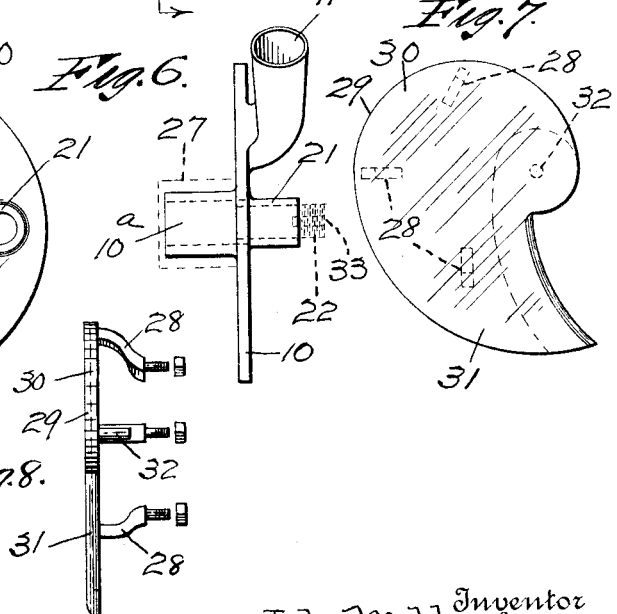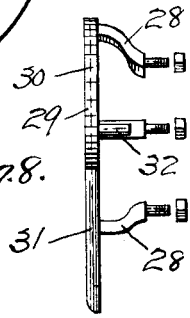

JOHN M. HUNT, OF STAATSBURG, NEW YORK.

GRASS-EDGING CUTTER.

1,179,434.  Specification of Letters Patent.  Patented Apr. 18, 1916.

Application filed February 11, 1913, Serial No. 747,676. Renewed February 25, 1916. Serial No. 80,540.

*To all whom it may concern:*

Be it known that I, JOHN M. HUNT, a subject of the King of England, and a resident of Staatsburg, county of Dutchess, and State of New York, have invented a certain new and useful Improvement in Grass-Edging Cutters, of which the following is a full, clear, and exact specification.

This invention relates more particularly to a class of machines adapted to be used for cutting grass.

My invention has for its object primarily to provide a form of grass edging cutter designed to be utilized especially for cutting with facility the edges of the grass of lawns, or similar places, and wherein is employed a revoluble cutter having a plurality of blades radially disposed from a common center in approximately the shape of a star so as to coöperate with the blade provided upon a guide plate which is mounted to a supporting plate provided with a suitable handle.

Another object of the invention is to provide an operating wheel for permitting the machine to be conveniently moved upon the ground, and which also serves to propel the cutter; and still another object of the invention is to provide means adapted to transmit rotation from the wheel to the cutter.

A further object of the invention is to provide a grass edging machine of simple construction, and which is susceptible of being made in various sizes so as to be very durable.

With these and other objects in view, the invention will be hereinafter more particularly described with reference to the accompanying drawings, which form a part of this specification, and will then be pointed out in the claims at the end of the description.

In the drawings, Figure 1 is a perspective view of one form of grass edging cutter embodying my invention. Fig. 2 is a side elevation of the cutter. Fig. 3 is a side view of the drive wheel used in the cutter. Fig. 4 is a longitudinal section, partly in detail, of the drive wheel. Fig. 5 is an enlarged side view of the supporting plate used in the machine. Fig. 6 is an edge view of the supporting plate. Fig. 7 is an enlarged side view of the guide plate and stationary blade used in the machine. Fig. 8 is an edge view of the guide plate. Fig. 9 is a face view of the star cutter employed in the machine. Fig. 10 is a view, partly in section, of the cutter. Fig. 11 is a side view of a pinion used in the machine. Fig. 12 is an end view of the pinion, and Fig. 13 is a view of the bolt or shaft connecting the drive wheel to the supporting plate.

The grass edging cutter has a supporting plate 10 which is preferably circular in shape, and extending laterally from the edge of the plate is a handle 11 which may be of any suitable form, or length. Extending from the center of one face of the supporting plate 10 is a sleeve $10^a$ and through the supporting plate 10, and through the sleeve $10^a$ is a continuous opening through which is passed a short shaft, or bolt 12. The opposite end of the shaft 12 is journaled in a bearing, or hub $12^a$ of a drive wheel 13, and said bearing is of a diameter to fit within the sleeve $10^a$ of the supporting plate so as to be freely revoluble therein.

The drive wheel 13 may be of a well known type having an annular rim 14 the peripheral edge of which is corrugated, or the peripheral edge of said rim may be concaved to provide two spaced annular flanges 15 and 16 adapted to penetrate the ground for preventing the wheel from sliding thereon when the machine is in use. Midway of the drive wheel 13 is an internal gear 17 which is rigidly held so as to revolve simultaneously with the drive wheel, and said gear is formed of a disk, or plate 18 from one face of which extends a concentric flange 19 provided with teeth 20 upon its inner peripheral surface.

Adjacent to the edge of the circular supporting plate 10 is a bearing 21 for a short stud, or shaft 22, and in proximity to one end of said shaft is keyed, or otherwise rigidly held a revoluble cutter, as 23. The cutter 23 has a plurality of blades 24 which are radially disposed in approximately the shape of a star from a hub 25, and all of said blades have one of the corresponding lengthwise edges thereof sharpened to a knife edge, as at 26.

Serving as a means to transmit rotation from the drive wheel 13 to the star cutter 23, upon the end of the rotatable stud 22 extending through the opening 21 of the supporting plate 10, is a pinion 27. The pinion 27 is in mesh with the teeth 20 of the internal gear 17 so that when the drive wheel 13 is revolved while being rolled upon the ground the rotation therefrom will be imparted to the star cutter through the rotation of the stud 22, the pinion 27, and the internal gear 17.

Adapted to be secured at spaced intervals by bolts to the supporting plate 10 are a number of posts, or brackets 28, and held to the opposite ends of said posts is a guide plate 29 which has a substantially circular body portion 30. The posts 28 are of sufficient lengths to position the guide plate 29 in close proximity to the star cutter 23, and projecting for a part of the edge of the body portion of said guide plate is a stationary blade, or coöperating cutter 31 which is preferably integrally formed with the body portion. The blade 31 is tapered so as to provide a pointed free end which extends some distance below the stud 22 of the star cutter, and the end portion of the blade is curved in a manner whereby its free end is disposed somewhat in the direction of said stud, as shown. Projecting from the guide plate 29 is a pin 32 the free end of which is inserted in a recess 33 provided in the opposed end of the stud 22 whereby this end of the stud may be rotatably supported. As illustrated, the star cutter 23 is rotatable in close proximity to the stationary blade, or cutter 31, and the concaved edge of said blade is sharpened to a knife edge to coöperate with the blades of the star cutter for efficiently cutting grass.

In operating the machine the drive wheel 13 is revolved upon the ground by pushing the hands 13 so that the plate 29 will serve as a guide for directing the machine accurately along the edge of a lawn, or other place. The cutting edge of the stationary blade 31 will then direct the blades of the grass between stationary cutting blade and the blades of the star cutter 23, and the edge of the lawn may thereby be evenly trimmed the desired length.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope of the appended claims.

Having thus described my invention, I claim as new and desire to secure by Letters Patent:—

1. A grass edging cutter, comprising in combination, a drive wheel, an internal gear integral with said drive wheel, a bearing at the center of said drive wheel and internal gear, a shoulder at the internal periphery of said internal gear, a supporting plate bearing on said shoulder and having a bearing opening therethrough, a handle socket integral with said supporting plate, a shaft having one end secured to the said supporting plate and having the other end journaled in the drive wheel, a stud journaled in the bearing opening of said supporting plate, a pinion on one end of said stud and adapted to mesh with said internal gear, a stationary guide plate spaced from said supporting plate, a blade integral with said guide plate, and a multiple blade cutter mounted on said stud and disposed between said supporting plate and guide plate and adapted to coöperate with the blade on said guide plate to cut grass when the drive wheel is rolled along the ground.

2. A grass edging cutter, comprising in combination, a drive wheel having a concave corrugated rim, an internal gear integral with the said drive wheel, a bearing at the center of said drive wheel and internal gear, a shoulder at the internal periphery of said internal gear, a supporting plate bearing on said shoulder and having a bearing opening therethrough, a handle socket integral with said supporting plate, a shaft having one end secured to the said supporting plate and having the other end journaled in the drive wheel, a stud journaled in the bearing opening in said supporting plate, a pinion on one end of said stud adapted to mesh with said internal gear, a stationary guide plate spaced from said supporting plate, a blade integral with said guide plate, and a multiple blade cutter mounted on said stud and disposed between said supporting plate and guide plate and adapted to coöperate with the blade on said guide plate to cut grass when the drive wheel is rolled along the ground.

This specification signed and witnessed this tenth day of February, A. D. 1913.

JOHN M. HUNT.

Witnesses:
 ROBT. B. ABBOTT,
 M. DERMODY.

Copies of this patent may be obtained for five cents each, by addressing the "Commissioner of Patents, Washington, D. C."